US007197029B1

(12) United States Patent
Osterhout et al.

(10) Patent No.: US 7,197,029 B1
(45) Date of Patent: Mar. 27, 2007

(54) SYSTEM AND METHOD FOR NETWORK PHONE HAVING ADAPTIVE TRANSMISSION MODES

(75) Inventors: Gregory T. Osterhout, Coppell, TX (US); Jim A. McAlear, Stittsville (CA); Mark Sosebee, Plano, TX (US)

(73) Assignee: Nortel Networks Limited, St. Laurent (CA)

( * ) Notice: Subject to any disclaimer, the term of this patent is extended or adjusted under 35 U.S.C. 154(b) by 880 days.

(21) Appl. No.: 09/671,736

(22) Filed: Sep. 29, 2000

(51) Int. Cl.
*H04L 12/66* (2006.01)
*H04Q 7/24* (2006.01)
*H04J 3/16* (2006.01)
*H04J 3/22* (2006.01)

(52) U.S. Cl. .................. 370/353; 370/338; 370/466
(58) Field of Classification Search ........ 370/351–353, 370/354, 463–468, 236
See application file for complete search history.

(56) References Cited

U.S. PATENT DOCUMENTS

| 5,768,513 A * | 6/1998 | Kuthyar et al. ............. 709/204 |
| 5,995,607 A * | 11/1999 | Beyda et al. .......... 379/202.01 |
| 6,064,653 A * | 5/2000 | Farris ......................... 370/237 |
| 6,078,582 A * | 6/2000 | Curry et al. ................. 370/356 |
| 6,275,574 B1* | 8/2001 | Oran ...................... 379/201.01 |
| 6,363,065 B1* | 3/2002 | Thornton et al. ........... 370/352 |
| 6,366,577 B1* | 4/2002 | Donovan .................... 370/352 |
| 6,449,259 B1* | 9/2002 | Allain et al. ................ 370/253 |
| 6,463,134 B1* | 10/2002 | Okada et al. ............ 379/93.24 |
| 6,523,062 B1* | 2/2003 | Bridgman et al. .......... 709/203 |
| 6,597,687 B1* | 7/2003 | Rao ............................ 370/352 |
| 6,628,666 B1* | 9/2003 | Pickering et al. ........... 370/468 |
| 6,728,215 B1* | 4/2004 | Alperovich et al. ........ 370/252 |

* cited by examiner

*Primary Examiner*—Huy D. Vu
*Assistant Examiner*—Daniel Ryman
(74) *Attorney, Agent, or Firm*—Hunton & Williams LLP

(57) ABSTRACT

A system for an adaptive network phone includes a SIP-enabled handset or other telephone device to be connected to a host computer, for instance via a USB connection. The host computer may initiate a call event when the user picks up the SIP device and wishes to make a call, in one regard by testing line conditions for a data connection to the Internet or other network to determine if a packet-based call will meet minimum noise, delay or other criteria of the user. If the conditions are satisfactory, the call may proceed as a packet network transmission, otherwise the call may revert to the public switched telephone network for fallback completion. The SIP-enabled handset may also interface to multimedia functions in the host computer, for instance to permit paging, answering machine, cordless operation or other features.

16 Claims, 5 Drawing Sheets

SYSTEM AND METHOD FOR NETWORK PHONE HAVING ADAPTIVE TRANSMISSION MODES

CROSS-REFERENCE TO RELATED APPLICATIONS

The subject matter of this application is related to the subject matter of U.S. patent application Ser. No. 09/188,297, now U.S. Pat. No. 6,389,029, entitled "Local Area Network Incorporating Universal Serial Bus Protocol" filed Nov. 10, 1998; Ser. No. 09/439,501, now U.S. Pat. No. 6,697,372, entitled "Local Area Network Accessory for Integrating USB Communications in Existing Networks" filed Nov. 12, 1999; Ser. No. 09/386,215, now U.S. Pat. No. 6,721,332, entitled "USB Networking on a Multiple Access Transmission Medium" filed Aug. 31, 1999, each of which applications is assigned or under obligation of assignment to the same entity as this application, and each of which is incorporated by reference.

FIELD OF THE INVENTION

The invention relates to the field of communications, and more particularly to a telephone device capable of transparently selecting SIP-based, POTS or other telephone service based on line and other conditions, or selectively interfacing to other computer-based applications or services.

BACKGROUND OF THE INVENTION

Computer integrated telephony has seen developments in recent years including packet-based telephony protocols, such as Voice-over-IP, Voice-over-ATM and others. Underlying transport media may not contain commands to manage call resources, such as to connect a caller to a recipient according to network address, available route, or meter or bill the call. Digital voice path techniques therefore typically require additional services for call setup, monitoring and call teardown purposes.

One protocol capable of generating and managing packet network call resources is the Session Initiation Protocol (SIP). The SIP protocol is known in the art, and provides cell setup and management services generally analogous to those of Signaling System 7 (SS7) in the public telephony network so that end systems, proxies and other data network platforms may initiate and terminate calls or other messaging events.

Thus, SIP includes messaging for click-to-dial, call invite, ringing, recipient acknowledgment, hangup (bye) and other commands and actions generally similar to the ringing, call pickup, termination and other functions of the public switched telephone network.

In connection with the increasing computer integration of telephony functions, some devices with telephony capability may be connected to host computers via standard interfaces, such as the Universal Serial Bus (USB) promulgated by Intel Corp. and others.

Even with the advent of the ability to initiate computer-based telephone connections over the Internet or other networks using SIP or other protocols, establishing a high-quality voice path between the connected parties using VoIP or other transport media is not guaranteed. This is in part because there is no standard for guaranteeing quality of service (QoS) over public data networks like the Internet.

Consequently, there are occasions when a telephone user may prefer to place a call over the public switched telephone network because of the comparatively robust grade of voice quality in that medium. However, no mechanisms exist for SIP-based or other devices to transparently revert to POTS calls when Internet quality degrades, or to automatically attempt an Internet-based call at those times when that medium offers cost or other advantages. Other drawbacks exist.

SUMMARY OF THE INVENTION

The invention overcoming these and other problems in the art relates to a system and method for a network phone having adaptive transmission modes, in which a SIP-enabled telephone is connected to a host computer for automatic call allocation to the public switched telephone or packet-based networks, depending on line conditions or other variables. In one embodiment the SIP-enabled telephone may interface to the host computer via a standard protocol such as USB.

In another embodiment, the host computer may execute a media management module to enable extended multimedia functions, such as intercom service, wireless telephone, voice browsing or other features using the SIP-enabled telephone as a front end device.

BRIEF DESCRIPTION OF THE DRAWINGS

The invention will be described with reference to the accompanying drawings, in which like elements are referenced with like numerals.

DETAILED DESCRIPTION OF PREFERRED EMBODIMENTS

Figure 1:
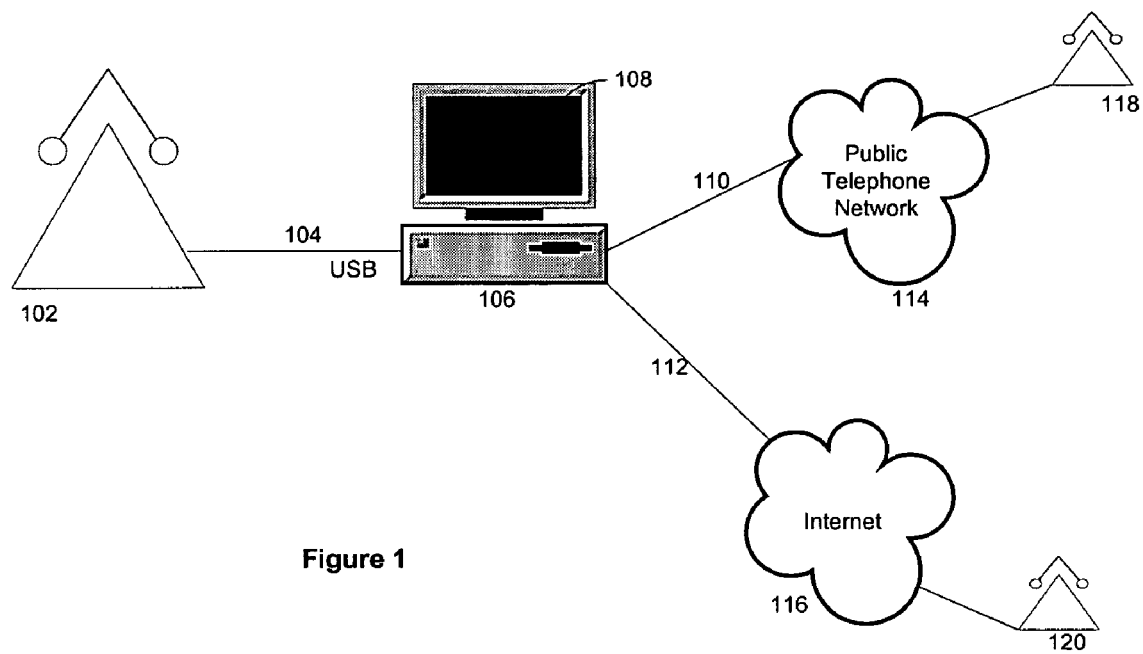
FIG. 1 illustrates a communications architecture according to an embodiment of the invention.

As illustrated in FIG. 1, an overall architecture for communications according to the invention may in one embodiment include a USB telephone 102 which is connected to a host computer 106 via USB connection 104. The host computer 106 may be or include, for example, a personal computer running the Microsoft Windows™ 95, 98, Millenium™, NT™, or 2000, Windows™CE™, PalmOS™, Unix, Linux, Solaris™, OS/2, BeOS™, MacOS™ or other operating system or platform.

The host computer 106 may include a microprocessor such as an Intel x86-based device, a Motorola 68K or PowerPC™ device, a MIPS, Hewlett-Packard Precision™, or Digital Equipment Corp. Alpha™ RISC processor, a microcontroller or other general or special purpose device operating under programmed control. The host computer 106 may furthermore include electronic memory such as RAM (random access memory) or EPROM (electronically programmable read only memory), storage such as a hard drive, CDROM or rewritable CDROM or other magnetic, optical or other media, and other associated components connected over an electronic bus, as will be appreciated by persons skilled in the art.

Furthermore, while referred to as a computer, the host computer 106 may also be or include other intelligent devices, for instance a network-enabled appliance such as a WebTV™ unit, radio-enabled Palm™ Pilot or similar unit, a set-top box, a networkable game-playing console such as Sony Playstation™ or Sega Dreamcas™, a browser-equipped cellular telephone, or other TCP/IP client or other device.

The host computer 106 may include a human interface 108, such as a graphical user interface on a CRT or other computer display, to display call, multimedia and other information to the user. The USB telephone 102 may include a handset with microphone and earpiece, or a headphone-type headset with microphone and earpiece, a standalone microphone, a ringer, associated electronics such as A/D converters, keypad, speaker or other wired or wireless transducers, transceivers and other devices.

The USB connection 104 may adhere to the USB 1.0, 2.0 or other standard supporting daisy-chained serial connections at throughputs for instance of 12 Mbs or other rates sufficient for telephony processing, and connect the USB telephone 102 and the host computer 106 for telephony use. Typically the communication between the host computer 106 (or other software/hardware device) and the USB phone 102 may use any of the different modes of USB data transfer to effect communications.

For instance, USB Control/Setup transfers may be used to enumerate, configure or reset the USB phone 102 for operation on the bus. USB Interrupt transfers may be used to detect any user activity with the phone including detecting specific key presses and on and off-hook actions. USB Isochronus transfers may be used to deliver speech payload to the phone speaker and receive it from the phone microphone. USB Bulk or Control transfers may be used to send ringing or other alerting signals (lamps) as well as to write any messages (such as caller ID) to an LCD or other display on the USB phone 102.

In general, given that VoIP communications standards are evolving, one robust approach for such a system whose sensitivity to these changing standards may be reduced is that which implements the telephone largely as a stimulus device. In this case, the driver software in the host computer 106 or other accompanying platform can be updated and evolve, and yet still interact with these terminal stimuli to conform to the current standards in place. In this way, a USB phone 102 according to the invention can remain useful over many generations of VoIP or other standards.

In an embodiment of the invention for instance illustrated in FIG. 1, the USB phone 102 may be connected to the host computer 106 via a wired USB connection 104. The host computer 106 is in turn connected to telecommunications and network resources for call processing. The host computer 106 may for instance be connected over communications link 110 to the public switched telephone network 114, to which in turn a recipient telephone device 118 is connected. The communications link 110 may be or include, for instance, the local loop connected to the local telephone central office in the user's area, or other resources.

The host computer 106 may also be connected to a data network, for instance via communications link 112 to the public Internet 116, to which a recipient telephone device 120 may in turn be connected.

Each of communications links 110 and 112 may be, include or interface to any one or more of, for instance, the Internet, an intranet, a PAN (Personal Area Network), a LAN (Local Area Network), a WAN (Wide Area Network) or a MAN (Metropolitan Area Network), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection.

Communications links 110 and 112 may furthermore be, include or interface to any one or more of a WAP (Wireless Application Protocol) link, a GPRS (General Packet Radio Service) link, a GSM (Global System for Mobile Communication) link, a CDMA (Code Division Multiple Access) or TDMA (Time Division Multiple Access) link such as a cellular phone channel, a GPS (Global Positioning System) link, CDPD (cellular digital packet data), a RIM (Research in Motion, Limited) duplex paging type device, a Bluetooth radio link, or an IEEE 802.11-based radio frequency link. Communications links 110 and 112 may yet further be, include or interface to any one or more of an RS-232 serial connection, an IEEE-1394 (Firewire) connection, a Fibre Channel connection, an IrDA (infrared) port, a SCSI (Small Computer Systems Interface) connection, a USB (Universal Serial Bus) connection or other wired or wireless, digital or analog interface or connection. Other communications links described herein may be, include or interface to similar resources.

Figure 2:
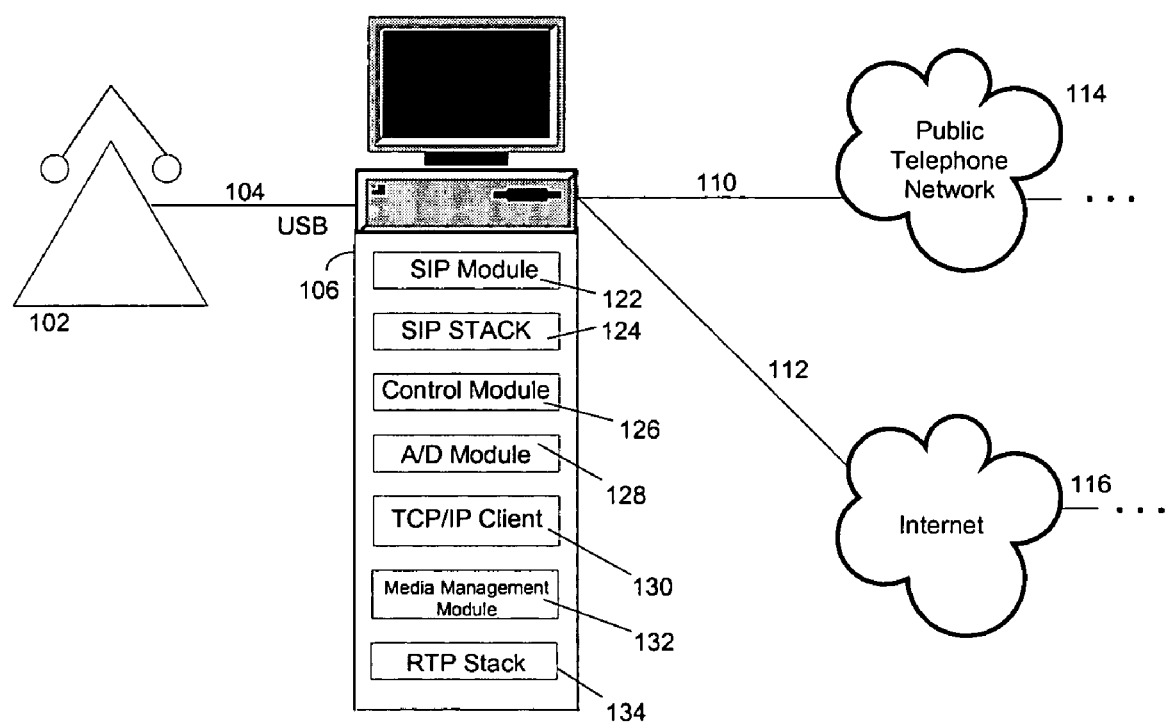
FIG. 2 illustrates a host computer in more detail according to an embodiment of the invention.

As illustrated in FIG. 2, in one embodiment a user wishing to use the USB telephone 102 to initiate a call event my activate the host computer 106, which may invoke, execute or manage a set of media and other resources for that purpose. As illustrated, upon activation a control module 126 may establish the connection with the USB telephone 102 via USB connection 104, generate graphical or other information on the human interface 108 and manage other tasks and resources needed for call processing.

The control module 126 may receive and store desired call parameters for the user, for instance minimum call quality parameters which will be acceptable for the user to place a network-based call. For instance, the control module 126 may monitor the communications link 112 to determine line conditions or other variables for the placement of a digital network call. These variables may include signal-to-noise ratio (SNR), packet congestion or delay, or other parameters affecting the quality, features, costs or other aspects of a call.

A user may set via the human interface 108 a minimum set of parameters including sound quality which they will accept for a SIP-based network call, which may be translated into SNR and other criteria by control module 126. Other parameters besides audio or network variables may be programmed, such as time of day, day of week, long distance or other telephone cost to take advantage of Internet-based telephony during high rate periods. User-defined routing variables, such as the routing of all 1+ numbers (long distance) using SIP or IP compliant networks but all other calls over POTS, may also be programmed.

Thereafter, upon activation of the control module 126 in preparation for a telephone call, the control module may probe the communications link 112 and other information to determine if the criteria for making a SIP-initiated network-based call are met, at the time of placing the call.

If the criteria are met, the control module 126 may set up the remainder of the resources necessary to establish a SIP-based connection to a recipient telephone device 120.

The control module may invoke SIP module 122 and SIP stack 124 to transmit, receive parse SIP commands, a Transfer Control Protocol/Internet Protocol (TCP/IP) client 130 for Internet or other network interface, and a Real Time Protocol (RTP) stack 134 to manage streaming media and other information for call processing.

For instance, the SIP module 122 may transmit a Call Invite command to the recipient telephone device 120, in this instance a SIP-enabled device, to await a 200 OK or other acknowledgment message for processing the call. Once the call setup is achieved via SIP messaging, a voice or other path, such as VoIP or VOATM, may be established between the USB telephone 102 and the recipient telephone device 120. Other voice path or other protocols may be used, such as voice over UDP or fax over TCP, or others known in the art. Call processing my proceed according to known messaging according to those protocols, once established.

Conversely, if during call initiation the control module 126 determines that conditions on communications link 112 or other variables are insufficient to prepare a call event according to the user's criteria, the control module 126 may automatically revert to delivering the call over the public switched telephone network 114, illustratively via communications link 110.

In this instance, the control module 126 may activate other resources, such as Analog-to-Digital (A/D) module 128 to convert the serial voice data received via USB connection 104 to analog output to the local loop. Call setup may then proceed according to the SS7 or other telephony protocols to recipient telephone device 118.

Since control module 126 may select between SIP/USB and POTS operation quickly and without intervention by the user, the user may enjoy the benefits of packet-based communications, including lower cost, automatically and transparently under conditions of their choosing. However, the user retains the benefits of fallback to the public telephony network on those occasions when data network transmission is degraded or otherwise undesirable. Those PSTN benefits include a high connection reliability and audio clarity, for which usage the user may or may not pay long distance or other charges.

Figure 3:
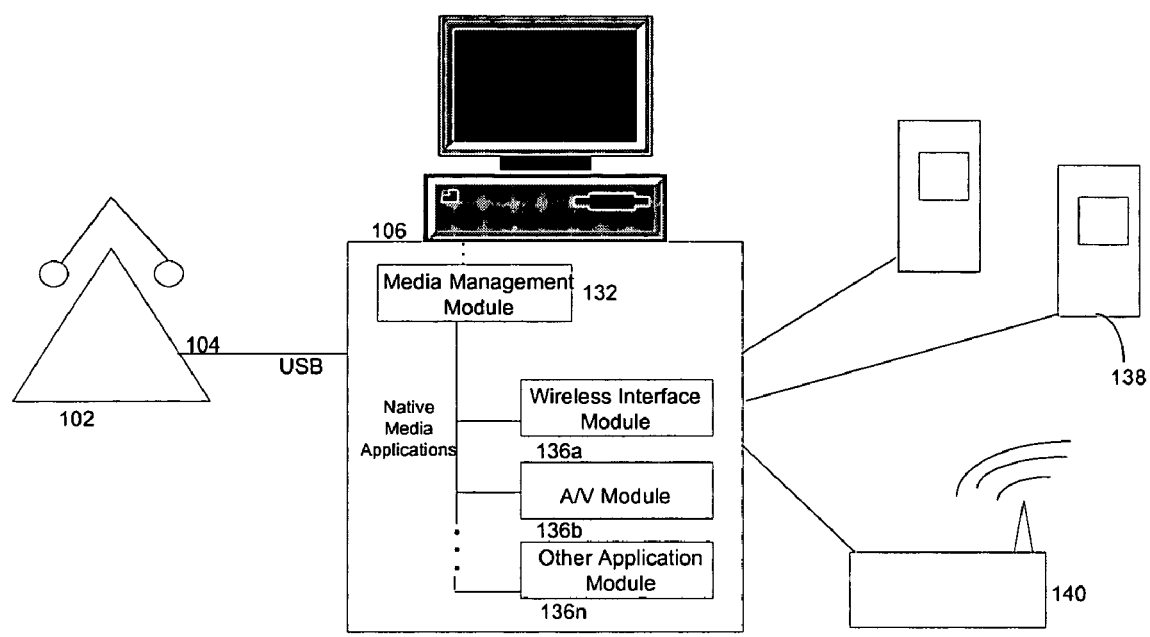
FIG. 3 illustrates a host computer in another regard including multimedia features according to an embodiment of the invention.

The provisioning of the control module 126 and media management module 132 as illustrated in an embodiment shown in FIG. 3 permits other feature extensions according to the invention. As shown in that figure, the media management module 132 may supervise a set of media resources on the host computer 106, including native media applications 136a, 136b 136n (n arbitrary) that make use of the audio, video and other media of the USB telephone 102, host computer 106 or the two combined.

For instance, as illustrated, the native media applications may include a wireless interface module 136a, communicating with transceiver 140. Transceiver 140 may be or include, for instance, a Bluetooth 2.45 Ghz station, an infrared transceiver or other device. The transceiver 140 and control module 126 may for instance permit the USB telephone 102 to act as an intercom, a pager, an answering machine for incoming calls or a cordless telephone for outgoing or incoming Internet or PSTN calls within proximity to host computer 106. Audio may be outputted to the user through transducers 138, such as computer speakers or other devices.

The native media applications may likewise include an audio/visual module 134b, such as an audio management tool such as an MP3 codec, RealAudio or other package. A video management tool such as Avid, RealVideo or other packages or protocols may also be used for video teleconferencing or other applications, if the USB telephone 102, host computer 106 or other resources are equipped with video input. Video or combined audio/video streams again may be output over data network or telephony links. Other multimedia applications are possible.

Figure 4:
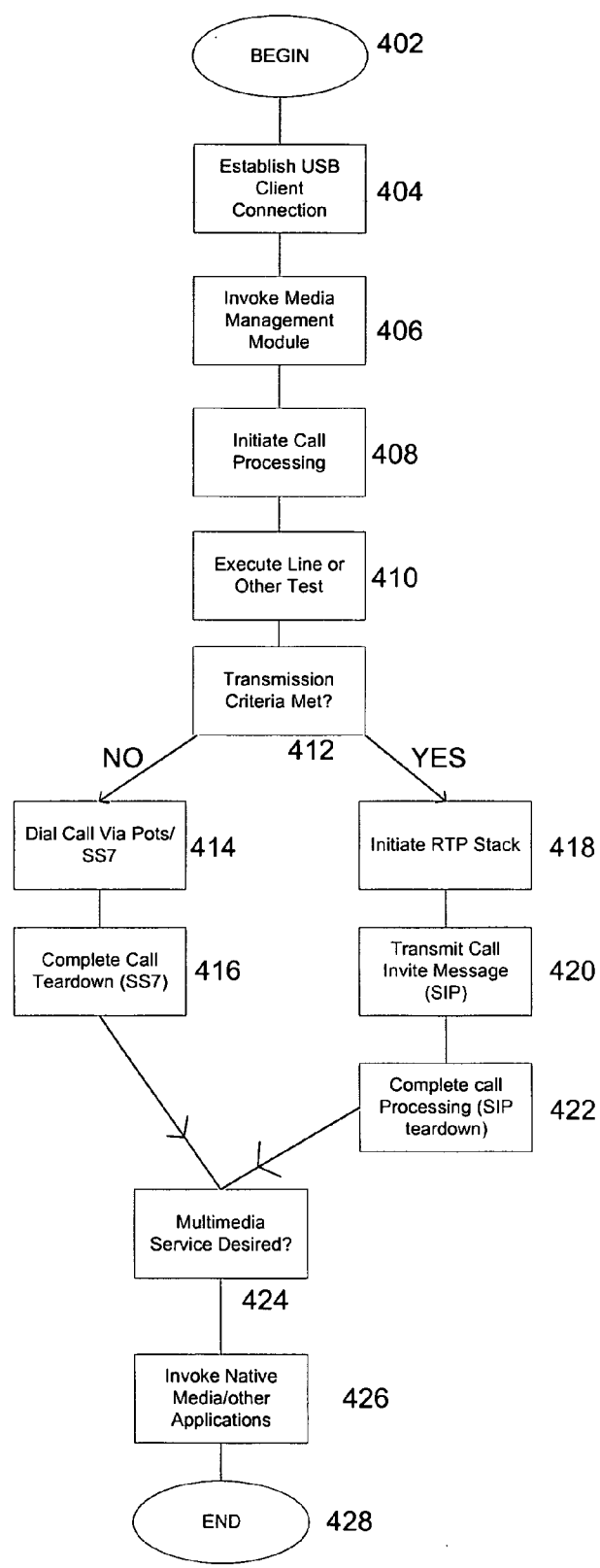
FIG. 4 illustrates a flowchart of call processing according to an embodiment of the invention.

Overall processing according to an embodiment of the invention is illustrated in FIG. 4. In step 402, processing begins. In step 404, a USB client connection may be established to USB telephone 102. In step 406, the host computer 106 may invoke the control module 126 to perform call testing, channel selection and call setup. In step 408, call processing may begin. In step 410, the control module 126 may execute line condition or other tests on communications link 112 to determine if minimum criteria are satisfied, such as SNR or packet delay.

In step 412, a determination may be made whether the transmission criteria for the user may be met. The control module 126 may record different criteria for different users, and present a user login screen to apply those criteria. If the determination of step 412 is that the transmission criteria are not met, then call processing proceeds to step 414. In step 414 a call may be dialed using the public switched telephone network via POTS and SS7 signaling, or other telephony standards. In step 416, call teardown of the public telephony network call may be completed and processing continues to step 424.

If the determination of step 412 is that the transmission criteria for the user are met, in step 418 the RTP stack 134 may be initialized for SIP-based call generation. In step 420, a SIP Call Invite command may be transmitted to the recipient telephone device 120. In step 422, the remainder of call processing, such as setting up voice path and eventually ending the call via a Bye command, may be completed.

In step 424, a determination may be made whether multimedia processing may be desired. If the answer is yes, processing proceeds to step 426 in which the native media applications 136a, 136b . . . 136n may be invoked as appropriate by media management module 132 for paging, intercom, cordless telephone, answering machine, video or other functions. After such media processing is complete or none is desired, processing ends in step 428.

Figure 5:
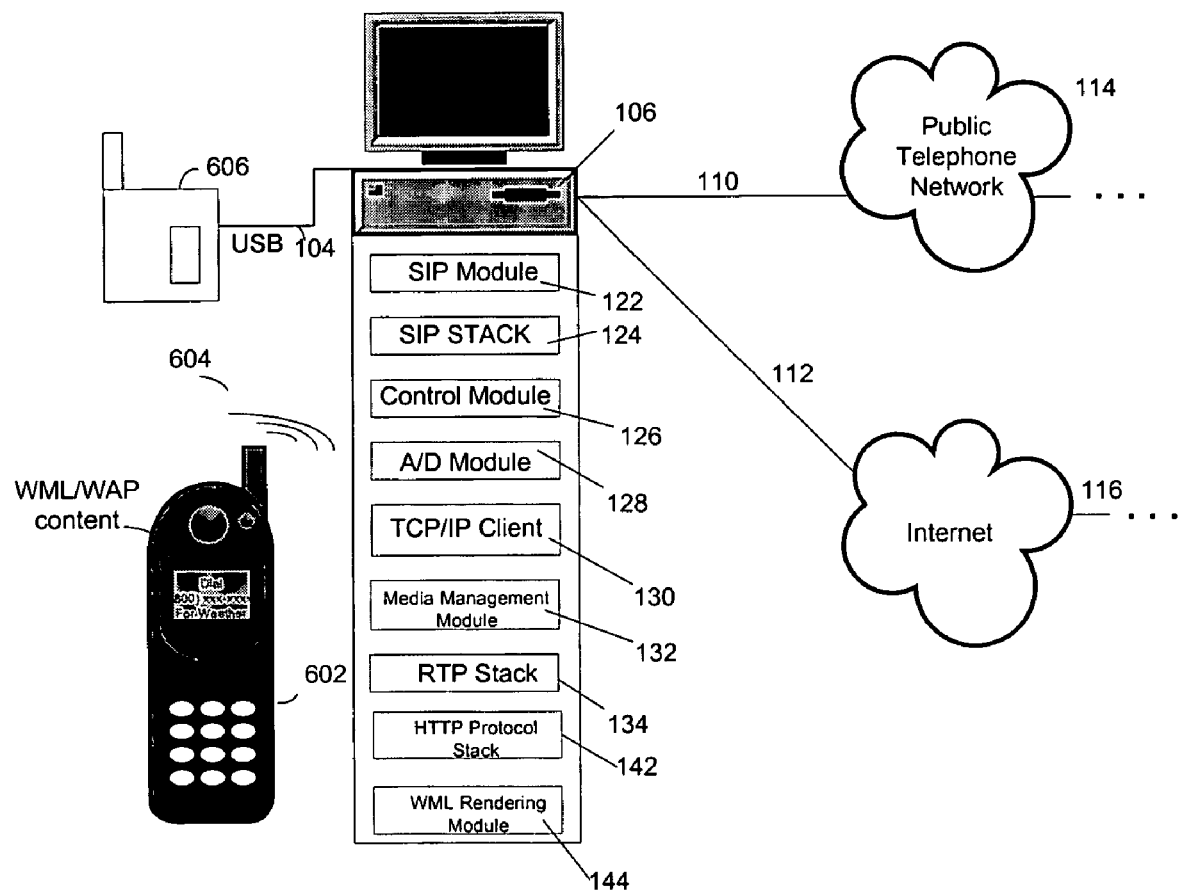
FIG. 5 illustrates a communications architecture according to an embodiment of the invention including WML capability.

In an embodiment of the invention illustrated in FIG. 5, the USB phone 602 may be implemented in a cordless arrangement, where the cordless base station 606 is attached to the host computer 106 via a USB connection 104. The handset of the USB phone 602 is free to roam at significant distances from the base station 606 and communicate to the base station 606 via a wireless channel 604, which may for instance be a radio frequency or infrared link.

In this embodiment, the transmission over the wireless link 604 may use conventional cordless techniques (with stimulus signaling with an analog or digital speech payload) and the conversion to/from USB format may occur in the base station 606.

When a user is away from host computer 106, a cordless phone with a connection through to the Internet can provide significant value over and above traditional cordless phones that operate into the PSTN. For instance, a USB phone 602 with an LCD or other display with appropriate keypad can deliver WAP Internet services for a user when he or she has no convenient access to host computer 106. In an embodiment, the driver software in the host computer 106 may use HTTP request/responses (including Get and Post) to get access to Wireless Markup Language (WML) documents on the Internet for presentation to the user on the handset, using HTTP protocol stack 142 and other resources. WML documents are the HTML equivalents for handheld browser phones.

A WML document allows explanatory text, hyperlinks and user input to be displayed and acted upon with small form factor browser phones. Illustrative of such services enabled are: headline news, sports, weather and stock reports, telephone banking, email and many other services. Conventionally, WAP services are provided on special purpose wireless phones, but there is no barrier to delivering WAP services to wired or cordless phones if these have access to an IP connection.

In a SIP/IP context, a WAP capability has several benefits, two of which are phone directories and navigation of SIP URLs. Exploiting the HTTP access to WML content (the portion of WAP needed in a wired/cordless context), a user may log into WML enabled telephone directories to search for numbers of persons they may wish to call.

The invention in this embodiment may incorporate a WML rendering module 144 to access WML content. The WML language allows hyperlinks to be embedded in the display, such that choosing a hyperlink typically causes the driver software in the host computer 106 to fetch a new WML document at a new URL associated with the hyperlink (useful for instance in navigating a large directory). However, the WML language also has the facility for specifying a phone number as the hyperlink action in this case, if the user chose that hyperlink the driver software may establish a telephone call to the specified phone number.

Finally, an extension to standard WML usage may allow a SIP URL to be associated with a hyperlink, such that when a user selects such a link, the driver software for the USB phone 602 immediately knows that a SIP connection is possible and the driver proceeds to set-up a SIP connection if appropriate. User convenience is enhanced in such circumstances, as a user browsing stock prices from a WML page may click to call a broker to initiate a stock trade or even bypass the broker and initiate a trade using WML interactions (not requiring SIP connections). It may be noted that HDML, a precursor to the WML standard developed by Phone.com, can also deliver an equivalent capability.

The foregoing description of the system and method of the invention is illustrative, and variations in configuration and implementation will occur to persons skilled in the art.

For instance, while the invention has been described with respect to a configuration where a single USB telephone 102 communicates to host computer 106 via a USB connection 104, more than one SIP or other network-enabled device could be connected to the host computer 106. Such devices may be built for protocols that extend or complement SIP, or to use other protocols such as ITU H.323. Such a plurality of devices could be connected to the host computer 106 with different types of connections, for instance Small Computer Systems Interface (SCSI) or other interfaces in addition to USB.

Moreover, while the host computer 106 is illustrated as a single device, the functions of host computer 106 may in another embodiment be distributed across a plurality of computers or other platforms, and different modules distributed therein. The communications links 110 and 112 have been illustrated as separate, but may be combined in another embodiment. Other resources illustrated as plural may be combined, and those illustrated as singular may be distributed across multiple modules, platforms or devices.

Other network configurations are possible. For instance, in another embodiment the telephone device itself may be both USB and SIP enabled, in which case the control logic to determine which network or data connection used for a given call is located in the handset. In a further embodiment, the telephone device itself may be both POTS and SIP enabled, in which case the base of the device contains both telephone (RJ-11 or other) connections plus a network connection or port for SIP, with control logic residing in the telephone device and no computer or other host being necessary. In a yet further embodiment, the telephone device may contain control logic and connections for each of POTS, USB and SIP for maximum connectivity.

Similarly, while the invention has been generally described in terms of reverting to call completion via the public switched telephone network when network conditions are not adequate, the calling mode could revert to other modes such as wireless telephone calls, a try-back mode to attempt another SIP-based call in a predetermined amount of time, or a series of such modes. Similarly, if desired the default medium may be set to POTS with transmission falling back to SIP or other based Internet telephony under defined conditions. The scope of the invention is accordingly intended to be limited only by the following claims.

What is claimed is:

1. A system for adaptively placing a call via one of a plurality of transmission modes, comprising:
a first interface to an SIP-enabled telephone device, wherein the first interface comprises a base station in wireless communication with the SIP-enabled telephone device, wherein the base station includes a converter for converting signals to or from a USB format;
a second interface to at least one communications link; and
a host, communicating with the first interface via a USB connection and the second interface, the host selectively initiating a call from the SIP-enabled telephone device as at least one of a telephone call and a data connection via the at least one communications link according to at least one user-defined transmission criterion, and wherein the host further comprises a Wireless Markup Language (WML) module for accessing WML content via the SIP-enabled telephone device and for associating the SIP-enabled telephone device with a hyperlink.

2. The system of claim 1, wherein the host comprises a computer.

3. The system of claim 1, wherein the at least one transmission criterion comprises at least one of cost, time of day, day of week, user-defined routing data, packet delay and signal to noise ratio.

4. The system of claim 1, wherein the call comprises a telephone call and the at least one communications link comprises the public switched telephone network.

5. The system of claim 1, wherein the call comprises a data connection and the at least one communications link comprises the Internet.

6. The system of claim 1, further comprising a media management module, the media management module executing at least one of a cordless telephone operation, an answering machine operation, a pager operation, an intercom operation, and an audio/visual operation via the SIP-enabled telephone device.

7. The system of claim 1, wherein the host selectively retries at least a data connection to reassess transmission conditions.

8. The system of claim 1, wherein the at least one communications link comprises a plurality of communications links, and the host selectively activates one of the communications links according to the at least one transmission criterion.

9. A method for adaptively placing a call via one of a plurality of transmission modes, comprising:
   a) receiving a call initiation request, via a first interface to an SIP-enabled telephone device, wherein the first interface comprises a base station in wireless communication with the SIP-enabled telephone device, wherein the base station includes a converter for converting signals to or from a USB format; and
   b) selectively initiating a call from the SIP-enabled telephone device as at least one of a telephone call and a data connection via at least one communications link according to at least one user-defined transmission criterion, wherein the communications link is communicating with a host that is communicating with the first interface via a USB connection, and wherein the host further comprises a Wireless Markup Language (WML) module for accessing WML content via the SIP-enabled telephone device and for associating the SIP-enabled telephone device with a hyperlink.

10. The method of claim 9, wherein the step b) of selectively initiating is executed by a host computer.

11. The method of claim 9, wherein the at least one transmission criterion comprises at least one of cost, time of day, day of week, user-defined routing data, packet delay and signal to noise ratio.

12. The method of claim 9, wherein the call comprises a telephone call and the at least one communications link comprises the public switched telephone network.

13. The method of claim 9, wherein the call comprises a data connection and the at least one communications link comprises the Internet.

14. The method of claim 9, further comprising a step of d) executing at least one of a cordless telephone operation, an answering machine operation, a pager operation, an intercom operation, and an audio/visual operation via the SIP-enabled telephone device.

15. The method of claim 9, further comprising a step of e) selectively retrying at least a data connection to reassess transmission conditions.

16. The method of claim 9, wherein the at least one communications link comprises a plurality of communications links, further comprising a step of f) selectively activating one of the communications links according to the at least one transmission criterion.

* * * * *